United States Patent [19]
Dima et al.

[11] 3,732,352
[45] May 8, 1973

[54] CONSTRUCTION FOR END OF CABLE SHEATH AND METHOD OF WELDING SHEATH

[75] Inventors: Attila Dima, Piscataway; George S. Eager, Jr., Upper Montclair, both of N.J.

[73] Assignee: General Cable Corproation, New York, N.Y.

[22] Filed: Sept. 2, 1971

[21] Appl. No.: 177,383

[52] U.S. Cl. .................... 174/10, 29/628, 29/630 F, 174/20, 174/22 R
[51] Int. Cl. ......................... H02g 15/20, H02g 1/14
[58] Field of Search .................. 174/8, 10, 20, 21 R, 174/22 R, 22 C, 23 R; 29/628, 630 F, 203 HM; 156/48, 49

[56] References Cited

UNITED STATES PATENTS

| 1,896,841 | 2/1933 | Eby | 174/10 UX |
| 2,053,163 | 9/1936 | Phillips | 174/21 R |

FOREIGN PATENTS OR APPLICATIONS

| 386,093 | 1/1933 | Great Britain | 174/10 |
| 525,637 | 9/1940 | Great Britain | 174/21 R |
| 547,617 | 9/1942 | Great Britain | 174/22 R |

*Primary Examiner*—Laramie E. Askin
*Attorney*—Nichol M. Sandoe et al.

[57] ABSTRACT

This application for welding an oil impermeable sheath of a high voltage power cable uses a tube inserted into the clearance between the core and the sheath of the cable to shut off oil circulation through this clearance immediately inside the sheath. The tube extends beyond the end of the sheath and oil flows from the end of the cable during the welding operation even though the space within the sheath immediately under the region of welding is free of oil. The sheath can be welded to a joint housing without oil contamination of the weld and the invention prevents vaporization of oil and possible blow-out of near molten areas of the sheath adjacent to the weld.

10 Claims, 5 Drawing Figures

3,732,352

CONSTRUCTION FOR END OF CABLE SHEATH AND METHOD OF WELDING SHEATH

BACKGROUND AND SUMMARY OF THE INVENTION

High voltage power cables insulated with paper or synthetic tapes and oil may be installed in pipe under oil pressure, or without pipe, if it is manufactured with an oil impermeable sheath. There are many different types of sheathing material, e.g., lead, aluminum, steel etc.

It is a common practice to make a hermetic connection between a metallic oil impermeable cable sheath and a joint housing by a solder-wipe. When other metallic materials than lead are used for cable sheathing, a welded connection may be mechanically more advantageous and reliable than a solder wipe connection or even a mechanical seal.

Great care is needed to protect a cable sheath and a joint housing from oil contamination in the area to be welded.

An oil barrier is needed inside of the cable sheath to divert the oil from the very hot part of the metallic cable sheath during the welding process. If the oil is in contact with the inside wall of the nearly molten metallic cable sheath, the oil will evaporate and produce a vapor pressure which may blow a hole in the almost molten cable sheath.

This invention provides a temporary oil barrier which is used to keep the oil out of the welded section during the welding. This barrier consists of a tube preferably of metal having good thermal conductance and a cylindrical seal made of a heat resistant elastomer. When the tube is pushed into the cable sheath, the cylindrical seal is pressed against the inside wall of the cable sheath and keeps the oil out of the high temperature area during the weld. The oil can freely circulate inside of the tube. Since the tube has a good heat conductance, it protects the cable insulation against the excessive heat produced by welding.

Other objects, features and advantages of the invention will appear or be pointed out as the description proceeds.

BRIEF DESCRIPTION OF THE DRAWING

In the drawing, forming a part hereof, in which like reference characters indicate corresponding parts in all of the views.

DESCRIPTION OF PREFERRED EMBODIMENT

Figure 1:
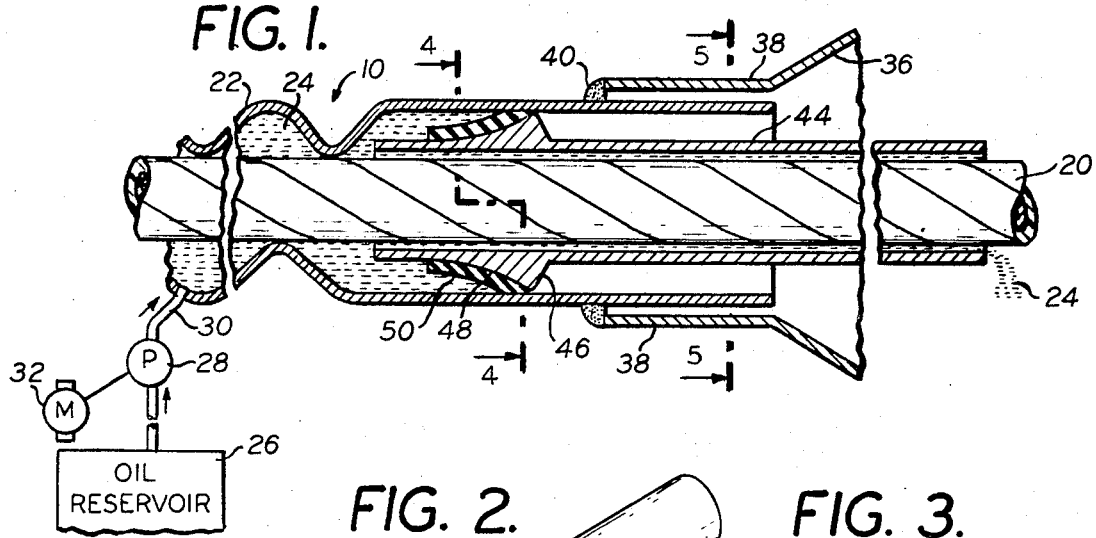
FIG. 1 is a sectional view, partly broken away, showing the sealing means of this invention assembled with a cable and sheath and showing the end portion of a joint housing welded to the cable sheath.
Figure 2:
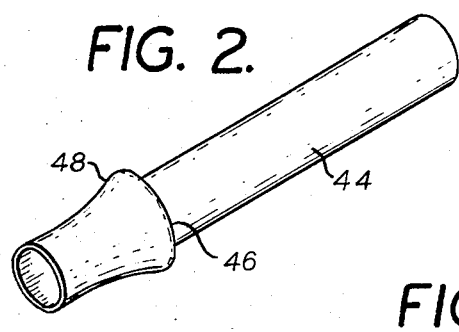
FIG. 2 is an isometric view of the tube shown in FIG. 1.
Figure 3:
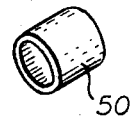
FIG. 3 is an isometric view of the elastomer sealing means which is located around the ridge on the tube in FIG. 1.
Figure 4:
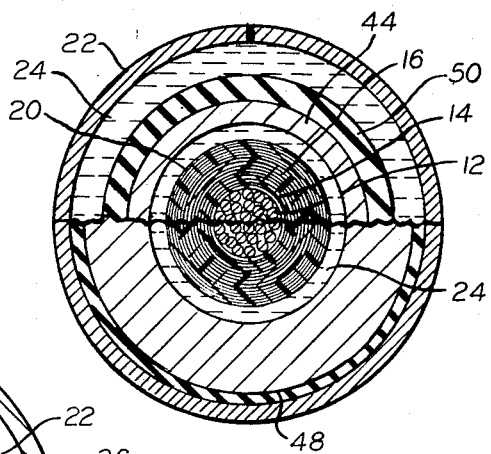
FIGS. 4 and 5 are enlarged sectional views taken on lines 4—4 and 5—5, respectively, of FIG. 1.
Figure 5:
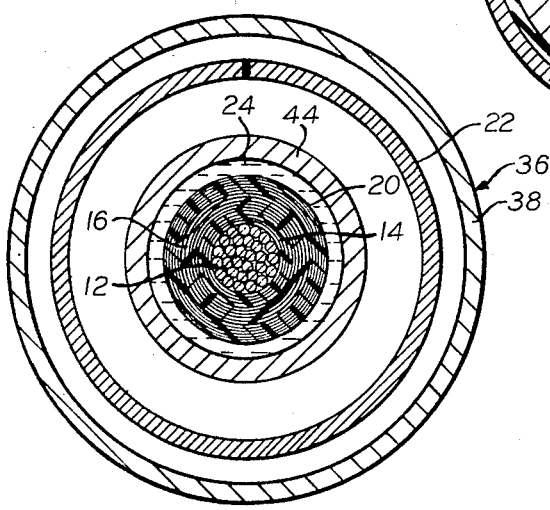

FIG. 1 shows a high voltage electric cable 10 which includes a conductor 12 (FIGS. 4 & 5), shown as stranded, surrounded by a semi-conducting conductor shielding 14. There is oil filled insulation 16 which may be paper or a porous plastic tape such as spunbonded polyethylene surrounding the core shield 14.

A semi-conducting insulation shielding 20 surrounds the insulation 16 and the outside of the cable is enclosed by an electrostatic shield 22 which is corrugated in cables of large size to increase the flexibility of the cable. This sheath 22 is made of metal. Lead was formerly in common use but cable sheaths are now made more often of aluminum or steel. The clearance between the cable sheath 22 and the cable core surrounded by the insulation shielding 20 is filled with oil of the same kind as used in the insulation 16 and this oil is indicated in FIG. 1 by the reference character 24.

The oil 24 is maintained under some pressure so that no air can enter the cable sheath. In FIG. 1 the sheath 22 is shown diagrammatically connected with an oil supply reservoir 26 from which oil is drawn by a pump 28 and discharged into the cable sheath and cable through tubing 30. The pump 28 is shown as driven by an electric motor 32. This apparatus is merely representative of means for maintaining the clearance in the sheath and the insulation of the cable supplied with oil under pressure which is somewhat higher than atmospheric pressure.

FIG. 1 shows a portion of a joint housing 36 which has a neck 38 that surrounds an end portion of the sheath 22. The joint housing 36 is connected to the sheath 22 by a fused connection such as a welded connection 40.

In FIG. 1 the sheath 22 is shown as corrugated except at the end portion which is left with a cylindrical shape. If the sheath is corrugated all the way to the end, as will occur if the sheath has been cut from a longer length of cable, then the corrugations must be pressed out or the apparatus of this invention must be of a size to fit within the minimum diameter of circumferentially extending corrugations.

In order to insure that no air can enter the cable during the connecting of the joint housing 36 to the sheath 22, it is necessary to maintain oil circulation through the cable during the welding of the housing to the sheath. This has presented problems in the prior art. One problem is oil contamination caused by oil flowing from the open end of the sheath and spreading over the outside of the sheath in the vicinity where the weld is to be made. Another problem is that if there is oil in contact with the sheath at the location where the weld is being made, the heat of the weld may be sufficient to evaporate the oil and cause vapor pressure within the sheath that sometimes blows a hole through the sheath at the region where the metal of the sheath is highly heated and nearly molten and therefore of very little tensile strength.

This invention includes a stiff metal sleeve 44 which fits loosely over the cable core with some clearance between the inside surface of the tube 44 and the outside surface of the insulation shielding 20 which comprises the circumference of the cable core.

This tube 44 has a circumferential ridge 46 which is steep on one side but shaped to provide a wedge surface 48 on the other side of the ridge toward the inner end of the tube 44.

A washer consisting of a cylindrical sealing element 50 made of a heat resistant elastomer is forced over the inner end of the tube 44 and upward along the wedge surface 48 as shown in FIG. 1. This cylindrical sealing element 50 may be made of silicone rubber, neoprene, or other heat resistant elastomers.

The maximum diameter of the ridge 46 is preferably slightly less than the inside diameter of the sheath 22. The sealing element 50 is pushed upward along the wedge surface 48, with resulting stretching of the elastomer, until the outer end of the sealing element 50 extends slightly beyond the circumference of the ridge 46 at the maximum diameter of the ridge. The tube 44 is then placed over the core of the cable and is pushed into the cable sheath 22 as shown in FIG. 1. The tube 44 is forced along the inside of the cable sheath in the clearance between the core and the cable sheath until the ridge 46 and the sealing element 50 reach a location beyond that where the weld 40 is to be located.

The wedge surface 48 compresses the sealing element 50 into firm contact with the inside surface of the cable sheath 22 so that none of the oil 24 can escape through the clearance between the cable sheath 22 and the tube 44. There is, however, sufficient clearance between the inside surface of the tube 44 and the cable core to permit circulation of oil through the cable and some oil discharges from the end of the tube 44 around the cable core but at a distance safely removed from the region of the weld so that there is no danger of this oil coming in contact with the cable sheath 22 or getting on the outside of the sheath at a location where the oil could contaminate the weld.

Because of the fact that the tube 44 is pushed into the cable sheath far enough to seal off the oil 24 at a location ahead of the region where the weld 40 is located, there is no oil in contact with the portion of the sheath 22 which is highly heated during the welding operation. Thus there can be no vaporization of oil in the sheath or pressure exerted by such vapor against the portions of the sheath that are highly heated and nearly molten during the welding operation.

The tube 44 is preferably made of metal which is a good conductor of heat. Thus heat radiated from the sheath 22 in the region of the weld is carried away by the metal of the tube 44 toward the outer end of the tube and such heat is also conducted through the metal of the tube 44 into the oil flowing through the tube to further dissipate heat and reduce the amount of heat that reaches the cable core during the welding operation. Thus the tube 44 serves the additional function of heat shield for the cable core in the region of the welding operation by which the joint housing is connected to the cable sheath.

After the weld 40 has cooled, the tube 44 is pulled back out of the clearance between the sheath 22 and the cable core. If the sealing element 50 is tightly wedged, the wedge surface 48 pulls part way out of the sealing element 50 and permits the sealing element to contract so that it has little or no friction with the sheath and can be removed with the tube 44. Oil is then free to circulate through the entire annular cross-section of the clearance between the sheath 22 and the cable core and to flow into the joint housing 36.

Joint housings are made in sections and another section of the joint housing 36 may be connected to another cable which is to be joined in the housing to the cable shown in FIG. 1. This other section of the joint housing can be connected to the other cable in the same way as already described in connection with FIG. 1. After connections between the cables have been made, the different parts of the joint housing are assembled and joined together, but this is conventional and forms no part of the present invention.

The preferred embodiment of the invention has been illustrated and described, but changes and modifications can be made and some features can be used in different combinations without departing from the invention as defined in the claims.

What is claimed is:

1. A construction on an end of an oil-filled cable, that has insulated conductors assembled in a core of the cable and an oil-tight sheath surrounding the cable core with clearance space, and insulating oil around the core, a tube fitting over an end portion of the core and extending forward for some distance into the clearance space between the core and the inside surface of the sheath, sealing means on the tube in position to prevent the oil in the sheath from running beyond the sealing means through the clearance space between the tube and sheath in a direction toward the end of the sheath, and the outer end of the tube remote from the sealing means being beyond said end of the sheath whereby oil passes between the tube and the cable beyond the sealing means but the space between the outside of the tube and the inside of the sheath is empty so long as the end of the sheath is free to drain.

2. The construction described in claim 1 characterized by the sheath being made of metal, and a metal connector housing into which the end portion of the sheath extends for a distance that locates the end of the housing over the sheath between the axial location of the sealing means and the end of the sheath, said end of the housing being connected to the sheath by welding.

3. The construction described in claim 1 characterized by the core of the cable having oil channels therein for circulation of oil in the cable including circulation longitudinally of the cable and through the tube and out through the end of the tube remote from the sealing means.

4. The construction described in claim 1 characterized by the sealing means including a ring of heat resistant elastomer surrounding the outside of the forward portion of the tube, and the tube having a circumferential ridge projecting upward to increase its diameter near the forward portion but behind the sealing ring for holding the ring against axial movement as the construction is assembled by pushing the tube into the space between the core and the sheath of the cable.

5. The construction described in claim 4 characterized by the ridge having a sloping face on its forward side and over which the ring is located, said sloping face serving as a wedge for thrusting the ring into contact with the inside surface of the sheath.

6. The construction described in claim 5 characterized by the tube being of one-piece construction around its full circumference and being a loose fit on the core and being made of metal and a good conductor of heat for carrying away heat by conduction from a region rearward of the ride where heat is applied to the outside of the sheath to fuse it to a connector housing, the ridge being of integral construction with the tube, and the ring being a sleeve of greater axial length than thickness, and surrounding the ridge with the rearward edge of the sleeve extending radially beyond the radial limits of the ridge and into sealing contact with the inside surface of the sheath.

7. The construction described in claim 5 characterized by means supplying oil to the inside of the sheath at a distance upstream from the end of the sheath at which the tube is located, and a pump connected to said oil supplying means for maintaining pressure on the oil in the cable and for maintaining a flow of oil out through the tube during welding of a housing to the sheath.

8. The method of fusion connecting an end portion of a sheath of an oil filled cable to a joint housing, comprising the steps of surrounding a core of the cable with an oil impervious tube that extends from a location beyond the end of the sheath and into a space between the core of the cable and the end portion of the sheath that surrounds the core with some clearance between the core and the sheath, sealing any clearance between sheath and the forward portion of the tube, and connecting a housing to the end portion of the sheath by a fusion bonding at a region located axially between the region of sealing and the adjacent end of the sheath while said sealing prevents oil in the cable from entering the space between the outside of the tube and the inside surface of the sheath.

9. The method described in claim 8 characterized by keeping the sheath, ahead of the sealing location, and the insulation of the cable, filled with oil during the bonding of the sheath to the housing, and maintaining a superatmospheric pressure on the oil in the cable during fusion bonding so that flow of oil through the cable in the tube discharges from the end of the cable beyond the region of fusion bonding and carries away heat from the region of fusion bonding, and removing the tube from the core after the fusion bonding step.

10. The method described in claim 8 characterized by welding the sheath to the housing as the fusion bonding, using a stiff metal tube as the tube that fits into the sheath and loosely around the core to surround the core, and effecting said sealing of any clearance portion of the tube between the forward portion of the tube and the inside surface of the sheath by forcing a wedge-shaped element of the tube into said clearance.

* * * * *